(12) United States Patent
Sakai et al.

(10) Patent No.: US 6,358,606 B1
(45) Date of Patent: Mar. 19, 2002

(54) PRESSURE-SENSITIVE ADHESIVE DOUBLE COATED TAPE OR SHEET, NON-SUBSTRATE PRESSURE-SENSITIVE ADHESIVE TRANSFER TAPE OR SHEET AND METHOD FOR MANUFACTURING THE SAME

(75) Inventors: Takahiro Sakai; Akiyoshi Masuda; Kazuo Nate, all of Kawasaki (JP)

(73) Assignee: Sliontec Corporation, Kanagawa (JP)

( * ) Notice: Subject to any disclaimer, the term of this patent is extended or adjusted under 35 U.S.C. 154(b) by 0 days.

(21) Appl. No.: 09/516,627

(22) Filed: Mar. 1, 2000

(30) Foreign Application Priority Data

Mar. 2, 1999 (JP) .......................... 11-054330
Mar. 2, 1999 (JP) .......................... 11-054333

(51) Int. Cl.$^7$ ................................ B32B 7/12
(52) U.S. Cl. ............... 428/343; 428/354; 428/355 AC; 428/515; 428/313.9; 522/120; 522/182; 427/516
(58) Field of Search ................ 428/345, 354, 428/355 CN, 355 AC, 355 N, 515, 313.9; 427/516; 522/120, 182, 31, 153; 526/328

(56) References Cited

FOREIGN PATENT DOCUMENTS

| JP | 63268784 | 11/1988 |
| JP | 9137142 | 5/1997 |

*Primary Examiner*—James J. Seidleck
*Assistant Examiner*—Melanie D. Bagwell
(74) *Attorney, Agent, or Firm*—Birch, Stewart, Kolasch & Birch, LLP

(57) ABSTRACT

The present invention relates to an acrylic pressure-sensitive adhesive double coated tape or sheet, an acrylic non-substrate pressure-sensitive adhesive transfer tape or sheet, and a method for manufacturing the same. The acrylic pressure-sensitive adhesive double coated tape or sheet and the acrylic non-substrate pressure-sensitive adhesive transfer tape or sheet are manufactured by the use of a light-cured adhesive whose main components are a (metha)alkyl ester acrylate monomer, a polar functional group containing monomer, an acrylic polymer having a photo-active functional group, and photopolymerization initiating agent, wherein the acrylic polymer having a photo-active functional group has a weight average molecular weight of 200,000 to 3,000,000 and the content of the photo-active functional group of 0.001 milli-equivalent/g to 0.5 milli-equivalent/g.

5 Claims, No Drawings

PRESSURE-SENSITIVE ADHESIVE DOUBLE COATED TAPE OR SHEET, NON-SUBSTRATE PRESSURE-SENSITIVE ADHESIVE TRANSFER TAPE OR SHEET AND METHOD FOR MANUFACTURING THE SAME

BACKGROUND OF THE INVENTION

1. Field of the Invention

The present invention relates to an acrylic pressure-sensitive adhesive double coated tape or sheet, an acrylic non-substrate pressure-sensitive adhesive transfer tape or sheet, and a method for manufacturing the same, and more particularly, to an acrylic pressure-sensitive adhesive double coated tape or sheet having good adhesive strength, holding power, and heat resistance, an acrylic non-substrate pressure-sensitive adhesive transfer tape or sheet having good adhesive strength, holding power, and heat resistance, and a method for manufacturing the same.

2. Description of the Prior Art

In an electric and electronic industry, a building and civil engineering industry, and an automobile industry, or the like, as higher performance and higher functionality of products and a variety of products have been required, the need for an adhesive or a pressure sensitive adhesive having high heat resistance, high adhesive capability, high reliability has been growing.

In recent years, in particular, from the viewpoint of improving workability and working environment, there has been an increase in the number of cases where various parts are bonded with the use of a tape-like or sheet-like pressure-sensitive adhesive ("pressure-sensitive adhesive" is hereinafter referred to as "adhesive") instead of a liquid adhesive. Further, the adhesive tape or sheet is used not only for the use in an interim adhesion but also for the use in a permanent adhesion.

Further, from the viewpoint of easy disposal of wastes, instead of a conventional mechanical bond, the use of an adhesive double coated tape or sheet has increased. There has been expected that an adhesive tape has a comparatively large thickness of, for example, 0.5 mm to 2 mm.

Still further, as parts and apparatuses have been reduced in size, the need for the thickness of an adhesive double coated tape or sheet has become severe and there has also been expected the development of an adhesive double coated tape or sheet having characteristics described above and having no holding member (i.e., no substrate).

As a method for manufacturing an adhesive tape, a method has been adopted in which a solvent type adhesive or such a water borne adhesive as emulsion is applied to a substrate, such as a polyester film, paper, or the like. The solvent is then volatilized by heating to thereby crosslink and cure the adhesive.

However, since the conventional solvent type adhesive tape cured by heating does not have sufficient heat resistance and reliability after bonding, adhesive tapes cured with ultraviolet rays (for example, Japanese Published Unexamined Patent Application No. 63-268784 and Japanese Published Unexamined Patent Application No. 9-137142) have been developed.

However, it is difficult to obtain an adhesive tape having high adhesion and high heat resistance at the same time, and good workability such as thick coating performance, curing performance with ultraviolet rays, or the like. Hence, the development of a material or a process for solving this problem has been desired.

An object of the present invention is to solve the above problems of the prior art and to provide an adhesive tape or sheet having high adhesive strength, holding power, heat resistance, and good workability such as thick coating performance, curing performance with ultraviolet rays, and a method for manufacturing the same.

SUMMARY OF THE INVENTION

In order to accomplish the above mentioned object, the present invention presents a pressure-sensitive adhesive double coated tape or sheet having a three-layer structure comprising an adhesive layer, a substrate layer and an adhesive layer, each of which is manufactured by the use of a light-cured adhesive whose main components are a (metha)alkyl ester acrylate monomer, a polar functional group containing monomer, an acrylic polymer having a photo-active functional group, and a photopolymerization initiating agent, wherein the acrylic polymer having a photo-active functional group has an average molecular weight of 200,000 to 3,000,000 and the content of the photo-active functional group is 0.001 milli-equivalent/g to 0.5 milli-equivalent/g.

In this case, the adhesive forming the adhesive layer is a light-cured adhesive whose main components are the (metha)alkyl ester acrylate monomer, the polar functional group containing monomer, the acrylic polymer having a photo-active functional group, and the photopolymerization initiating agent. The adhesive forming the substrate layer is a light-cured adhesive comprising the adhesive forming the adhesive layer and inorganic hollow particles added thereto.

Further, the present invention presents a method for manufacturing a pressure-sensitive adhesive double coated tape or sheet having a three-layer structure comprising an adhesive layer, a substrate layer, and an adhesive layer, the method comprising the steps of:

applying the above mentioned light-cured adhesive to a sheet substrate to form the adhesive layer;

applying the above mentioned light-cured adhesive to the adhesive layer to form the substrate layer;

applying the above mentioned light-cured adhesive to form the adhesive layer; and applying light to the adhesive layer, the substrate layer, and the adhesive layer to cure the three layers at the same time.

Still further, the present invention presents a non-substrate pressure-sensitive adhesive transfer tape or sheet manufactured by the use of a light-cured adhesive whose main components are a (metha)alkyl ester acrylate monomer, a polar functional group containing monomer, an acrylic polymer having a photo-active functional group, and a photopolymerization initiating agent, wherein the acrylic polymer having a photo-active functional group has an average molecular weight of 200,000 to 3,000,000 and the content of the photo-active functional group is 0.001 milli-equivalent/g to 0.5 milli-equivalent/g.

Still further, the present invention presents a method for manufacturing a non-substrate pressure-sensitive adhesive transfer tape or sheet, the method comprising the steps of:

applying the above mentioned light-cured adhesive to a sheet substrate to form an adhesive layer having a thickness of 10 $\mu$m to 2000 $\mu$m; and applying light to the adhesive layer to cure it.

According to the present invention, a pressure-sensitive adhesive double coated tape or sheet having excellent heat resistance, adhesive strength, holding power, and in particular, excellent holding power at high temperatures can be obtained and can well be manufactured in mass production because it is excellent in thick coating performance and curing performance by ultraviolet rays.

DETAILED DESCRIPTION OF THE INVENTION

In order to accomplish the object described above, the inventors have investigated various kinds of materials and processes and have found the fact that a pressure-sensitive adhesive double coated tape or sheet, which is made by applying a light-cured adhesive whose main components are a (metha)alkylester acrylate monomer, a polar functional group containing monomer, an acrylic polymer having a photo-active functional group, and a photopolymerization initiating agent to a sheet substrate and by applying light thereto to polymerize it, has high adhesion, high holding power, high heat resistance and further good workability such as thick coating performance, curing performance by ultraviolet rays, and the like.

It was found that an acrylic polymer having an average molecular weight of 200,000 to 3,000,000 and a photo-active functional group content of 0.001 to 0.5 milli-equivalent/g functioned well as an acrylic polymer having a photo-active functional group. It was verified that a pressure-sensitive adhesive double coated tape or sheet made by the use of a light-cured adhesive containing this acrylic polymer showed excellent adhesive characteristics.

In other words, the use of the above mentioned light-cured adhesive makes it possible to produce an adhesive tape having excellent heat resistance, adhesive strength, holding power (in particular, holding power at a temperature of 150° C. or more when metal is subjected to baking finish), and excellent workability such as thick coating performance, and the like.

Hereinafter, material used in the present invention and a method for manufacturing an adhesive tape using the same will be described.

An acrylic polymer having a photo-active functional group is used for improving the heat resistance of an adhesive tape and also for workability such as a thick coating performance, or the like. It is advisable to use an acrylic polymer having an average molecular weight of 200,000 to 3,000,000 and a photo-active functional group content of 0.001 to 0.5 milli-equivalent/g as the acrylic polymer having a photo-active functional group used in the present invention.

A method for reacting a hydroxyl group of the side chain of an acrylic polymer with an isocyanate compound having a (metha) acryloyloxy group, for example, such as 2-methacryloyloxy ethyl isocyanate, is employed for introducing photo-active functional groups into an acrylic polymer. In this manner, an acrylic polymer having photo-active functional groups such as a (metha) acryloyloxy group can be obtained. However, a method for introducing photo-active functional groups into an acrylic polymer is not limited to this method.

In the case where the weight average molecular weight of an acrylic polymer having photo-active functional groups is smaller than 200,000, it is necessary to increase the amount of additional acrylic polymer having photo-active functional groups so as to obtain an adhesive composition having a high viscosity of several thousands to several tens of thousands cP in consideration of thick coating. This makes it difficult for an adhesive tape to have excellent adhesive characteristics (more specifically, an adhesive strength of 5 kgf/25 mm or more for a stainless steel substrate in the case where the adhesive tape has a three layer structure, and an adhesive strength of 1 kgf/25 mm or more for a stainless substrate in the case where the adhesive tape has no substrate) and excellent heat resistance (more specifically, holding power at a temperature of 150° C.) at the same time, which is not desirable.

Further, in the case where the weight average molecular weight of an acrylic polymer is larger than 3,000,000, an adhesive tape having excellent characteristics can be obtained, but cannot be manufactured in mass production.

Further, in the case where the photo-active functional group content of an acrylic polymer having photo-active functional groups is smaller than 0.001 milli-equivalent/g, the holding power of the adhesive tape at 150° C. deteriorates. In the case where the photo-active functional group content of an acrylic polymer having photo-active functional groups is larger than 0.5 milli-equivalent/g, the adhesive strength of an adhesive tape having a three layer structure to a stainless steel substrate is smaller than 5 kgf/25 mm, and the adhesive strength of an adhesive tape having no substrate to a stainless steel substrate is smaller than 1 kgf/25 mm. Either of these two cases is not desirable. In view of these cases, the composition of the above mentioned acrylic polymer having photo-active functional groups in the adhesive composition is controlled according to objective adhesive characteristics and viscosity required during coating and, in ordinary cases, is 10 wt % to 50 wt % in the adhesive composition in the case of an adhesive tape having a three layer structure, and 5 wt % to 50 wt % in the case of an adhesive tape having no substrate.

Meanwhile, the main components of the above mentioned acrylic polymer having a photo-active functional group are a copolymer of a (metha)alkyl ester acrylate monomer and a polar functional group containing monomer, such as a copolymer of acrylic acid 2-ethylhexyl and methacrylic acid 2-hydroxyethyl, a ternary copolymer of isooctyl acrylate, acrylic acid, and methacrylic acid 2-hydroxyethyl, or the like. However, the components are not limited to these.

Next, as the above mentioned (metha)alkyl ester acrylate monomer, a (metha)alkyl ester acrylate having an alkyl group ordinarily has a number of carbon less than 20, as typified by, for example, an ethyl group, a propyl group, a butyl group, a pentyl group, a hexyl group, a 2-ethyl hexyl group, an octyl group, an isooctyl group, a nonyl group, an isononyl group, and a decyl group. In this connection, the above mentioned (metha)alkyl ester acrylate is used singly or in combination of two or more kinds. Also, in the present invention, for example, a part of the above mentioned (metha)alkyl ester acrylate may be replaced by a copolymeric monomer such as vinyl acetate.

As the above mentioned monomer having a polar functional group used in the present invention, there is a polymeric unsaturated monomer having a polar functional group such as a carboxyl group, a hydroxyl group, and an amino group in a molecule, such as an acrylic acid, a methacrylic acid, an itaconic acid, methacrylic acid 2-hydroxyl ethyl, methacrylic acid 2-hydroxypropyl, dimethylamino ethyl acrylate, acrylonitrile, methacrylonitrile, N-vinyl-2-pyrrolidone.

It is preferable that the amount of the monomer having a polar functional group is 1 to 30 parts by weight to 99 to 70 parts by weight of the above described (metha)alkyl ester acrylate. In the case where the amount of a monomer having a polar functional group is less than 1 part by weight, the adhesive strength of an adhesive tape decreases, and in the case where the amount of a monomer having a polar functional group is more than 30 parts by weight, the adhesive characteristics of the adhesive tape at low temperatures deteriorate. Either one of these cases is not preferred. In this respect, the above mentioned monomer having a polar functional group is used singly or in combination of two or more kinds.

An ordinary photopolymerization initiating agent used for a radical photopolymerization, such as a vinyl group, a (metha) acryloyloxy group or the like, is used as the photopolymerization initiating agent described above: for example, a benzyldimethylketallic compound such as 2,2-dimethoxy-1,2-diphenylethane-1-on, or the like; and α-hydroxyketone compound such as 1-hydroxycyclohexylphenylketone, 2-hydroxy-2-methyl-1-phenylpropane-1-on; anα-aminoketone compound such as 2-benzyl-2-dimethylamino-1-(4-morpholinophenyl) butanone-1; a bisacylphosphineoxide compound such as bis (2,4,6-trimethylbenzoyl) phenylphosphineoxide; a mixture of bisacylphosphineoxide such as bis (2,6-dimethoxybenzoyl)-2,4,4-trimethylpentylphosphineoxide and 2-hydroxy-2-methyl-1-phenyl propane-1-on at a ratio of 1 to 3; a mixture of bisacylphosphineoxide such as bis (2,6-dimethoxybenzoyl)-2,4,4-trimethylpentylphosphineoxide and 1-hydroxycyclohexylphenylketone at a ratio of 1 to 1; and a benzoin ethyl ether based compound such as benzoin ethyl ether, benzoin isopropyl ether. In particular, a photopolymerization initiating agent such as bisacylphosphineoxide is preferable which generates two or more radicals from one molecule when light is applied thereto.

It is preferable that these photopolymerization initiating agents are used at a rate of 0.001 to 5 parts by weight to 100 parts by weight of a light-cured adhesive. In the case where the amount used is less than 0.001 parts by weight, it is difficult to finish polymerization complete. In the case where the amount used is larger than 5 parts by weight, the molecular weight of an adhesive polymer to be obtained is so small as to degrade that the adhesive characteristics of the adhesive tape degrades. In either of these cases, it is not desirable from the viewpoint of adhesive characteristics.

Further, if necessary, a photopolymeric compound such as a multi-functional acrylic (methacryl) monomer of about 0.001 to 5 parts to 100 parts by weight of the total adhesive composition may be added to the light-cured adhesive in accordance with the present invention. As examples of this photopolymeric compound, there are hexanedioldi (metha) acrylate, neopenthylglycoldi (metha)acrylate, pentaerythritoldi (metha)acrylate, trimethylolpropanetri (metha) acrylate, dipentaerythritolhexa (metha)acrylate, polyethyleneglycoldi (metha)acrylate, polypropyleneglycoldi (metha)acrylate, epoxyacrylate, polyesteracrylate, urethaneacrylate, or the like.

Still further, a tackifier usually used for an acrylic resin such as a rosin-based resin, a terpen-based resin, a petroleum-based resin or the like may be added to the light-cured adhesive used for manufacturing the pressure-sensitive adhesive double coated tape.

Still further, an ordinary adding agent such as a viscosity rising agent, a thixotropic agent, and a filler may be added to the light-cured adhesive in accordance with the present invention. The above mentioned viscosity rising agent includes an acrylic rubber, an epichlorohydorin rubber, or the like, and ultrafine silica powder is among the above mentioned thixotropic agent. The above mentioned filler includes inorganic particles made of calcium carbide, titanium dioxide, silicone dioxide, organic particles such as nylon beads, acrylic beads, and silicone beads, inorganic hollow particles such as glass balloons, alumina balloons, or the like, organic hollow particles such as acrylic balloons, vinylidene chloride balloons, or the like, and organic or inorganic short fibers made of polyester, nylon, rayon, glass or the like. These are used for improving the mechanical characteristics (stress relaxation) of the adhesive tape and are used in a range where there is no effect on photo-curing performance.

A method for applying the adhesive is not particularly limited and a roll coater, a die coater and a comma coating method may be used. Also, a gravure coater may be used in the case where the adhesive is applied in thin thickness. The viscosity of the adhesive is adjusted according to the thickness of the film of the adhesive.

Since oxygen in the air or dissolved in the adhesive inhibits a curing reaction when the light-cured adhesive is cured, light is applied to the light-cured adhesive in an atmosphere sufficiently replaced by an inert gas such as a nitrogen gas or the like, or via a protective film. In order to prevent a hindrance of oxygen to curing, a tin chloride such as tin (I) octyanate, or a phosphorus compound such as triisodecylphosphate, may be added to the adhesive.

A lamp radiating light having a wavelength of 250 nm to 450 nm such as a chemical lamp, a black light, a low-pressure mercury lamp, or the like is preferable for a light source that is used when the adhesive tape is cured with light. As for the intensity of the light, a comparatively low intensity of ultraviolet rays of 0.1 mW/cm$^2$ to 10 mW/cm$^2$ at a wavelength of 365 nm is preferable to obtain an acrylic polymer having a high molecule.

A method for manufacturing pressure-sensitive adhesive double coated tape or sheet in accordance with the present invention will hereinafter be described.

First, in order to obtain an adhesive composition to be the first and third adhesive layers of an adhesive tape having a three layer structure comprising an adhesive layer, a substrate layer and an adhesive layer, a (metha)alkyl ester acrylate monomer and a monomer having a polar functional agent are mixed into a predetermined composition and a predetermined amount of an acrylic polymer having a photo-active functional group and a predetermined amount of a photopolymerization initiating agent are then added thereto, and the mixture of them is sufficiently stirred to produce a uniform adhesive solution. It is preferable that the viscosity of the adhesive solution is 1,000 cP to 10,000 cP at 25° C. from the viewpoint of coating. The viscosity is adjusted according to the film thickness of the adhesive. Also, the (metha) acrylic monomer having multi-functional groups or the thixotropic agent, both of which are described above, may be added to the above described adhesive solution, if necessary.

Also, in order to produce a substrate layer composition of the second layer of the adhesive tape having a three layer structure, a (metha)alkyl ester acrylate monomer, a polar functional group containing monomer, an acrylic polymer having a photo-active functional group, a photopolymerization initiating agent and inorganic hollow particles such as glass balloons or the like are mixed into a predetermined composition and the mixture of them are sufficiently stirred to produce a uniform substrate layer composition. It is necessary to make the substrate layer thicker than the above mentioned adhesive layers so as to provide the substrate layer with a stress releasing property, and the viscosity of the substrate layer composition is preferably 2,000 cP to 30,000 cP at 25° C. from the viewpoint of coating. The viscosity is adjusted according to the thickness of the film. Also, the above mentioned multi-functional (metha) acrylic monomer, the thixotropic agent, or the like, may be added to the substrate layer composition described above, if necessary.

A method for manufacturing a pressure-sensitive adhesive double coated tape or sheet having a three layer structure using the adhesive layer composition and the substrate layer composition made in this manner will be described below.

First, the adhesive composition described above is applied to a sheet substrate subjected to a release treatment such as a polyester film by a comma coating method to usually produce a film having a predetermined thickness of about 10 $\mu$m to 100 $\mu$m. The above-described substrate layer composition is applied to the film by the die-coater to usually produce a film having a predetermined thickness of about 50 $\mu$m to 2,000 $\mu$m. The adhesive composition described above is applied to the film by the comma coating method to usually produce a film having a predetermined thickness of about 10 $\mu$m to 100 $\mu$m. An adhesive layer made in this manner and having a three layer structure is irradiated with ultraviolet rays having an intensity of about 1 mW/cm$^2$ at a wavelength of 365 nm for 20 seconds to 5 minutes in a nitrogen atmosphere using a black light to cure the three layers at the same time, and the sheet substrate is then separated to produce a pressure-sensitive adhesive double coated tape. The pressure-sensitive adhesive double coated tape in accordance with the present invention is produced in this manner and shows excellent adhesion and heat resistance when it is adhered to an adherent.

Next, a method for manufacturing a non-substrate pressure-sensitive adhesive transfer tape or sheet will specifically be described.

First, the (metha)alkyl ester acrylate monomer described above and the polar functional group containing monomer described above are mixed in a predetermined composition. A predetermined amount of the above mentioned acrylic polymer having a photo-active functional group and a predetermined amount of the above mentioned photopolymerization initiating agent are then added thereto, and the mixture of them are sufficiently stirred to produce a uniform adhesive solution. Here, it is preferable that the viscosity of the adhesive solution is 1,000 cP to 5,000 cP at 25° C. The viscosity of the adhesive solution is adjusted according to the film thickness necessary for an adhesive tape or sheet. Also, if necessary, the above mentioned multi-functional (metha)acrylic monomer, the thixotropic agent, the filler, or the like, may be added to the above mentioned adhesive solution. Next, the above mentioned adhesive solution is applied to a sheet substrate subjected to a release treatment such as a polyester film usually in a thickness of 10 $\mu$m to 2000 $\mu$m and is irradiated with ultraviolet rays having an intensity of about 0.1 mW/cm$^2$ to 10 mW/cm$^2$ at a wavelength of 365 nm for 20 seconds to 5 minutes in a nitrogen atmosphere using a black light to cure the adhesive layer and the sheet substrate is then separated to produce a non-substrate pressure-sensitive adhesive transfer tape or sheet. The pressure-sensitive adhesive transfer tape or sheet in accordance with the present invention is produced in this manner and shows excellent adhesion and heat resistance when it is adhered to an adherent.

The pressure-sensitive adhesive double coated tape or sheet and the pressure-sensitive adhesive transfer tape or sheet in accordance with the present invention and the method for manufacturing the same will be described below based on the specific examples of the preferred embodiments. In this connection, the word "part" in the following description of the specific examples of the preferred embodiments and the comparative examples will mean a part by weight.

Example 1

To 63 parts of acrylic acid 2-ethylhexyl and 7 parts of acrylic acid were added 30 parts of an acrylic polymer having a weight average molecule weight of 700,000 and containing a photo-active functional group of 0.01 milli-equivalent/g and whose main component is acrylic acid 2-ethylhexyl and 0.5 part of Irgacure 1850 as a photopolymerization initiating agent (where Irgacure is a trademark of CIBA-GEIGY Corp. and Irgacure 1850 is a mixture of bisacylphosphineoxide such as 4-trimethylpentylphosphineoxide and 1-hydroxycyclohexylphenylketone at a ratio of 1 to 1), and the mixture was sufficiently stirred to produce a uniform adhesive composition having a viscosity of 3,000 cP at 25° C.

Also, similarly, to 65 parts of acrylic acid 2-ethylhexyl and 5 parts of acrylic acid were added 30 parts of an acrylic polymer having a weight average molecule weight of 700,000 and containing a photo-active functional group of 0.01 milli-equivalent/g and whose main component is acrylic acid 2-ethylhexyl, 0.5 part of Irgacure 1850, and 50 parts of hollow glass beads having an average particle diameter of about 50 $\mu$m and a specific gravity of 0.15, and the mixture of them was sufficiently stirred to produce a uniform substrate layer composition.

Next, the above mentioned adhesive composition was applied to a polyester film subjected to a release treatment and having a thickness of 50 $\mu$m in a thickness of 50 $\mu$m, and the above mentioned substrate layer composition was then applied thereto in a thickness of 500 $\mu$m and finally the above mentioned adhesive composition was applied thereto in a thickness of 50 $\mu$m. This was irradiated on the upper and lower surfaces with ultraviolet rays having an intensity of 1 mW/cm$^2$ at a wavelength of 365 nm for 2 minutes using a black light in a nitrogen atmosphere to produce a pressure-sensitive adhesive double coated tape having a three layer structure. The adhesive strength of this adhesive tape to a stainless steel plate was 6 kgf/25 mm and shearing adhesive strength was 8 kgf/cm$^2$. Also, the adhesive tape was subjected to a shear holding power test (load:1 kg) conducted at 180° C. for 1 hour and the adhesive tape was not observed to be shifted or dropped, which showed the excellent adhesion and heat resistance of the adhesive tape.

Example 2

To 65 parts of isooctyl acrylate and 5 parts of acrylic acid were added 30 parts of an acrylic polymer having a weight average molecule weight of 700,000 and containing a photo-active functional group of 0.01 milli-equivalent/g and whose main component is acrylic acid 2-ethylhexyl and 0.5 part of Irgacure 1850, and the mixture of them was sufficiently stirred to produce a uniform adhesive composition having a viscosity of 2,500 cP at 25° C.

Also, similarly, to 65 parts of acrylic acid 2-isooctyl and 5 parts of acrylic acid were added 30 parts of an acrylic polymer having a weight average molecule weight of 700,000 and containing a photo-active functional group of 0.01 milli-equivalent/g and whose main component is acrylic acid 2-ethylhexyl, 0.5 part of Irgacure 1850, and 100 parts of hollow glass beads having an average particle diameter of about 50 $\mu$m and a specific gravity of 0.15, and the mixture of them was sufficiently stirred to produce a uniform substrate layer composition.

Next, the above mentioned adhesive composition was applied to a polyester film subjected to a release treatment and having a thickness of 50 μm, in a thickness of 60 μm, and the above mentioned substrate layer composition was then applied thereto in a thickness of 800 μm and finally the above mentioned adhesive composition was applied thereto in a thickness of 60 μm. This was irradiated on the upper and lower surfaces with ultraviolet rays having an intensity of 1 mW/cm² at a wavelength of 365 nm for 3 minutes using a black light in a nitrogen atmosphere to produce a pressure-sensitive adhesive double coated tape having a three layer structure. The adhesive strength of this adhesive tape to a stainless steel plate was 8 kgf/25 mm and shearing adhesive strength thereof was 10 kgf/cm². Also, the adhesive tape was subjected to a shear holding power test (load:1 kg) conducted at 180° C. for 1 hour and the adhesive tape was not observed to be shifted or dropped, which showed the excellent adhesion and heat resistance of the adhesive tape.

Examples 3 to 10

As is the case with Examples 1 and 2, pressure-sensitive adhesive double coated tapes having a three-layer structure were manufactured with compositions and under manufacturing conditions shown in Table 1. In Table 1, 0.5 part of Irgacure 1850 was used as the photopolymerization initiating agent in every example. The measurement results of adhesive strength, shearing adhesive strength, and shear holding power of these pressure-sensitive adhesive double coated tapes will be shown in Table 2. As is evident from Table 2, every pressure-sensitive adhesive double coated tape showed excellent adhesion characteristics and heat resistance. Also, every adhesive composition showed an excellent coating performance and a film forming performance when it was made into the adhesive tape or sheet.

Comparative Example 1

To 63 parts of acrylic acid 2-ethylhexyl and 7 parts of an acrylic acid were added 30 parts of an acrylic polymer having a weight average molecular weight of 700,000 and containing no photo-active functional group and whose main component is acrylic acid 2-ethylhexyl and 0.5 part of Irgacure 1850, and the mixture of them was sufficiently stirred to produce a uniform adhesive composition having a viscosity of 3,000 cP at 25° C.

Also, similarly, to 65 parts of acrylic acid 2-ethylhexyl and 5 parts of an acrylic acid were added 30 parts of an acrylic polymer having a weight average molecular weight of 700,000 and containing no photo-active functional group and whose main component is acrylic acid 2-ethylhexyl, 0.5 part of Irgacure1850, and 50 parts of hollow glass beads having an average particle diameter of about 50 μm and a specific gravity of 0.15, and the mixture of them was sufficiently stirred to produce a uniform substrate layer composition.

Next, the above mentioned adhesive composition was applied to a polyester film subjected to a release treatment and having a thickness of 50 μm, in a thickness of 50 μm, and the above mentioned substrate layer composition was then applied thereto in a thickness of 500 μm. Finally, the above mentioned adhesive composition was applied thereto in a thickness of 50 μm. This was irradiated on the upper and lower surfaces with ultraviolet rays having an intensity of 1 mW/cm² at a wavelength of 365 nm for 2 minutes using a black light in a nitrogen atmosphere to produce a pressure-sensitive adhesive double coated tape having a three-layer structure. The adhesive strength of this adhesive tape to a stainless steel plate was 6 kgf/25 mm and shearing adhesive strength thereof was 6 kgf/cm². Also, a shear holding power test (load:1 kg) was conducted at 80° C. and 180° C. and the adhesive tape was observed to be dropped within 10 minutes, which showed the poor adhesion and heat resistance of the adhesive tape.

TABLE 1

| Example | |
|---|---|
| 3 | ① acrylic acid 2-ethylhexyl (70), acrylic acid (10), acrylic polymer (Mw = 1,000,000, photo-active functional group = 0.02 milli-equivalent/g) (20), 50 μm, ② above mentioned composition + hollow glass beads (100), 600 μm |
| 4 | ① acrylic acid 2-ethylhexyl (65), acrylic acid (5), acrylic polymer (Mw = 600,000, photo-active functional group = 0.03 milli-equivalent/g) (30), 50 μm, ② above mentioned composition + hollow glass beads (80), 300 μm |
| 5 | ① acrylic acid 2-isooctyl (73), acrylic acid (7), acrylic polymer (Mw = 1,000,000, photo-active functional group = 0.05 milli-equivalent/g) (20), 60 μm, ② above mentioned composition + hollow glass beads (100), 1 mm |
| 6 | ① acrylic acid 2-isooctyl (53), acrylic acid (7), acrylic polymer (Mw = 800,000, photo-active functional group = 0.01 milli-equivalent/g) (40), 80 μm, ② above mentioned composition + hollow glass beads (50), 500 μm |
| 7 | ① acrylic acid 2-ethylhexyl (63), acrylic acid (7), acrylic polymer (Mw = 800,000, photo-active functional group = 0.01 milli-equivalent/g) (30), 40 μm, ② above mentioned composition + hollow glass beads (100), 600 μm |
| 8 | ① acrylic acid 2-ethylhexyl (63), acrylic acid (7), acrylic polymer (Mw = 800,000, photo-active functional group = 0.1 milli-equivalent/g) (30), 50 μm, ② above mentioned composition + hollow glass beads (100), 500 μm |
| 9 | ① acrylic acid 2-ethylhexyl (63), acrylic acid (7), acrylic polymer (Mw = 800,000, photo-active functional group = 0.005 milli-equivalent/g) (30), 1,6-hexanedioldiacrylate (0.1), 60 μm, ② above mentioned composition + hollow glass beads (100), 500 μm |
| 10 | ① acrylic acid 2-ethylhexyl (63), acrylic acid (7), acrylic polymer (Mw = 800,000, photo-active functional group = 0.01 milli-equivalent/g) (30), ultrafine silica powder (AEROSIL 300 (*)) (5), 50 μm, ② above mentioned composition + hollow glass beads (100), 500 μm |

① composition of light-cured adhesive, film thickness,
② composition of substrate layer, film thickness
( ) means parts by weight,
(*) AEROLSIL is a trademark of AEROSIL NIPPON Corp.

TABLE 2

| Example | Adhesive strength (kgf/25 mm) to stainless steel | Shearing adhesive strength (kgf/cm²) | Shear holding power (load: 1 kg) (n. c. means adhesive is not shifted) |
|---|---|---|---|
| 3 | 6 | 8 | 40° C./24 hours, n. c. 180° C./1 hour, n. c. |
| 4 | 5 | 7 | 40° C./24 hours, n. c. 120° C./1 hour, n. c. 180° C./1 hour, n. c. |
| 5 | 6 | 7 | 40° C./24 hours, n. c. 180° C./1 hour, n. c. |
| 6 | 6 | 7 | 40° C./24 hours, n. c. 120° C./1 hour, n. c. 180° C./1 hour, n. c. |

TABLE 2-continued

| Example | Adhesive strength (kgf/25 mm) to stainless steel | Shearing adhesive strength (kgf/cm²) | Shear holding power (load: 1 kg) (n. c. means adhesive is not shifted) |
|---|---|---|---|
| 7 | 5 | 7 | 40° C./24 hours, n. c. 180° C./1 hour, n. c. |
| 8 | 5 | 6 | 40° C./7 days, n. c. 120° C./1 hour, n. c. 180° C./1 hour, n. c. |
| 9 | 7 | 8 | 40° C./24 hours, n. c. 180° C./1 hour, n. c. |
| 10 | 6 | 8 | 40° C./7 days, n. c. 120° C./1 hour, n. c. 180° C./1 hour, n. c. |

Example 11

To 63 parts of acrylic acid 2-ethylhexyl and 7 parts of an acrylic acid were added 30 parts of an acrylic polymer having a weight average molecular weight of 700,000 and containing a photo-active functional group of 0.01 milli-equivalent/g and whose main component is acrylic acid 2-ethylhexyl and 0.5 part of Irgacure 1850, and the mixture of them was sufficiently stirred to produce a uniform adhesive composition having a viscosity of 3,000 cP at 25° C.

Next, the above mentioned adhesive composition was applied to a polyester film subjected to a release treatment and having a thickness of 50 μm in a thickness of 50 μm by a comma coating method, and was then irradiated with ultraviolet rays having an intensity of 1 mW/cm² at a wavelength of 365 nm for 2 minutes using a black light in a nitrogen atmosphere, and the sheet substrate was separated to produce a non-substrate pressure-sensitive adhesive transfer tape having a thickness of 50 μm. The adhesive strength of this adhesive tape to a stainless steel plate was 1.4 kgf/25 mm. This adhesive tape was subjected to a shear holding power test (load:1 kg) conducted at 40° C. for 24 hours and at 180° C. for 1 hour, and the adhesive tape was not observed to be shifted or dropped, which showed the excellent adhesion and heat resistance of the adhesive tape. In this connection, the ball tack of this adhesive tape was 7.

Example 12

To 63 parts of isooctyl acrylate and 7 parts of an acrylic acid were added 30 parts of an acrylic polymer having a weight average molecular weight of 800,000 and containing a photo-active functional group of 0.02 milli-equivalent/g and whose main component is acrylic acid 2-ethylhexyl and 0.3 part of Irgacure 1850, and the mixture of them was sufficiently stirred to produce a uniform adhesive composition having a viscosity of 2,500 cP at 25° C.

Next, the above mentioned adhesive composition was applied to a polyester film subjected to a release treatment and having a thickness of 50 μm in a thickness of 100 μm by die coater, and was then irradiated with ultraviolet rays having an intensity of 1 mW/cm² at a wavelength of 365 nm for 3 minutes using a black light in a nitrogen atmosphere, and the sheet substrate was then separated to produce a non-substrate pressure-sensitive adhesive transfer tape having a thickness of 100 μm. The adhesive strength of this adhesive tape to a stainless steel plate was 1.3 kgf/25 mm. This adhesive tape is subjected to a shear holding power test (load:1 kg) conducted at 40° C. for 24 hours and at 180° C. for 1 hour, and the adhesive tape was not observed to be shifted or dropped, which showed the excellent adhesion and heat resistance of the adhesive tape. In this connection, the ball tack of this adhesive tape was 7.

Examples 13 to 20

As is the case with Examples 11 and 12, non-substrate pressure-sensitive adhesive transfer tapes were manufactured with compositions under manufacturing conditions shown in Table 3. In Table 3, 0.5 part of Irgacure 1850 was used as the photopolymerization initiating agent in every example. The measurement results of adhesive strength, shear holding power and the like of these non-substrate pressure-sensitive adhesive tapes will be shown in Table 4. As is evident from Table 4, every non-substrate pressure-sensitive adhesive transfer tapes showed excellent adhesion characteristics and heat resistance. Also, every adhesive composition showed an excellent coating performance, a film forming performance and a curability when it was made into the adhesive tape or sheet.

TABLE 3

| Example | |
|---|---|
| 13 | ① acrylic acid 2-ethylhexyl (70), acrylic acid (10), acrylic polymer (Mw = 1,000,000, photo-active functional group = 0.02 milli-equivalent/g) (20), ② 2 mW/cm², 3 minutes, ③ 200 μm |
| 14 | ① acrylic acid 2-ethylhexyl (65), acrylic acid (5), acrylic polymer (Mw = 600,000, photo-active functional group = 0.03 milli-equivalent/g) (30), ② 1 mW/cm², 3 minutes, ③ 100 μm |
| 15 | ① acrylic acid-isooctyl (73), acrylic acid (7), acrylic polymer (Mw = 1,000,000, photo-active functional group = 0.05 milli-equivalent/g) (20), ② 1 mW/cm², 3 minutes, ③ 100 μm |
| 16 | ① acrylic acid-isooctyl (53), acrylic acid (7), acrylic polymer (Mw = 800,000, photo-active functional group = 0.01 milli-equivalent/g) (40), ② 1 mW/cm², 3 minutes, ③ 100 μm |
| 17 | ① acrylic acid 2-ethylhexyl (63), acrylic acid (7), acrylic polymer (Mw = 800,000, photo-active functional group = 0.01 milli-equivalent/g) (30), ② 1 mW/cm², 3 minutes, ③ 100 μm |
| 18 | ① acrylic acid 2-ethylhexyl (63), acrylic acid (7), acrylic polymer (Mw = 800,000, photo-active functional group = 0.1 milli-equivalent/g) (30), ② 1 mW/cm², 3 minutes, ③ 100 μm |
| 19 | ① acrylic acid 2-ethylhexyl (63), acrylic acid (7), acrylic polymer (Mw = 800,000, photo-active functional group = 0.005 milli-equivalent/g) (30), 1,6-hexanedioldiacrylate (0.1), ② 1 mW/cm², 3 minutes, ③ 100 μm |
| 20 | ① acrylic acid 2-ethylhexyl (63), acrylic acid (7), acrylic polymer (Mw = 800,000, photo-active functional group = 0.01 milli-equivalent/g) (30), hollow glass particles (50), ② 1 mW/cm², 3 minutes, ③ 100 μm |

① composition of light-cured adhesive,
( ) means parts by weight
② conditions of irradiation of light,
③ thickness of adhesive sheet,

TABLE 4

| Example | Adhesive strength (gf/25 mm) to stainless steel | Ball tack | Shear holding power (load: 1 kg) (n. c. means adhesive is not shifted) |
|---|---|---|---|
| 13 | 1,300 | 8 | 40° C./24 hours, n. c. 180° C./1 hour, n. c. |

TABLE 4-continued

| Example | Adhesive strength (gf/25 mm) to stainless steel | Ball tack | Shear holding power (load: 1 kg) (n. c. means adhesive is not shifted) |
|---|---|---|---|
| 14 | 1,000 | 7 | 40° C./24 hours, n. c. |
|   |   |   | 120° C./1 hour, n. c. |
|   |   |   | 180° C./1 hour, n. c. |
| 15 | 1,400 | 7 | 40° C./24 hours, n. c. |
|   |   |   | 180° C./1 hour, n. c. |
| 16 | 1,100 | 7 | 40° C./24 hours, n. c. |
|   |   |   | 120° C./1 hour, n. c. |
|   |   |   | 180° C./1 hour, n. c. |
| 17 | 1,000 | 7 | 40° C./24 hours, n. c. |
|   |   |   | 180° C./1 hour, n. c. |
| 18 | 1,000 | 6 | 40° C./7 days n. c. |
|   |   |   | 120° C./1 hour, n. c. |
|   |   |   | 180° C./1 hour, n. c. |
| 19 | 1,500 | 7 | 40° C./24 hours, n. c. |
|   |   |   | 180° C./1 hour, n. c. |
| 20 | 1,400 | 7 | 40° /7 days, n. c. |
|   |   |   | 120° C./1 hour, n. c. |
|   |   |   | 180° C./1 hour, n. c. |

Comparative Example 2

To 63 parts of acrylic acid 2-ethylhexyl and 7 parts of an acrylic acid were added 30 parts of an acrylic polymer having a weight average molecular weight of 180,000 and containing a photo-active functional group of 1 milli-equivalent/g and whose main component is acrylic acid 2-ethylhexyl and 0.3 part of Irgacure 1850, and the mixture of them was sufficiently stirred to produce a uniform adhesive composition having a viscosity of 2,500 cP at 25° C.

Next, the above mentioned adhesive composition was applied to a polyester film subjected to a release treatment and having a thickness of 50 μm in a thickness of 50 μm, and was then irradiated with ultraviolet rays having an intensity of 1 mW/cm$^2$ at a wavelength of 365 nm for 2 minutes using a black light in a nitrogen atmosphere to produce a non-substrate pressure-sensitive adhesive transfer tape having a thickness of 50 μm. This adhesive tape was subjected to a shear holding power test (load:1 kg) conducted at 40° C. for 24 hours and at 180° C. for 1 hour, and was not observed to be shifted and dropped, but showed a small adhesive strength to a stainless steel plate of 300 gf/25 mm. This showed that this adhesive tape could not have both of excellent adhesion and excellent heat resistance.

What is claimed is:

1. A pressure-sensitive adhesive double coated tape or sheet having a three-layer structure comprising an adhesive layer, a substrate layer and an adhesive layer, each of which is manufactured by the use of a light-cured adhesive whose main components are a (metha)alkyl ester acrylate monomer, a polar functional group containing monomer, an acrylic polymer having a photo-active functional group, and a photopolymerization initiating agent, wherein the acrylic polymer having a photo-active functional group has an average molecular weight of 200,000 to 3,000,000 and the content of the photo-active functional group is 0.001 milli-equivalent/g to 0.5 milli-equivalent/g.

2. A pressure-sensitive adhesive double coated tape or sheet as claimed in claim 1, wherein the adhesive forming the adhesive layer is a light-cured adhesive whose main components are the (metha)alkyl ester acrylate monomer, the polar functional group containing monomer, the photo-active functional group containing acrylic polymer, and the photopolymerization initiating agent, and wherein the adhesive forming the substrate layer is a light-cured adhesive comprising the adhesive forming the adhesive layer and inorganic hollow particles added thereto.

3. A method for manufacturing a pressure-sensitive adhesive double coated tape or sheet having a three-layer structure comprising an adhesive layer, a substrate layer, and an adhesive layer, the method comprising the steps of:

applying the light-cured adhesive as claimed in claim 2 to a sheet substrate to form the adhesive layer;

applying said light-cured adhesive to the adhesive layer to form the substrate layer;

applying light-cured adhesive to the substrate layer to form the adhesive layer; and applying light to the adhesive layer, the substrate layer, and the adhesive layer to cure the three layers at the same time.

4. A non-substrate pressure-sensitive adhesive transfer tape or sheet manufactured by the use of a light-cured adhesive whose main components are a (metha)alkyl ester acrylate monomer, a polar functional group containing monomer, an acrylic polymer having a photo-active functional group, and a photopolymerization initiating agent, wherein the acrylic polymer having a photo-active functional group has an average molecular weight of 200,000 to 3,000,000 and the content of the photo-active functional group is 0.001 milli-equivalent/g to 0.5 milli-equivalent/g.

5. A method for manufacturing a non-substrate pressure-sensitive adhesive transfer tape or sheet, the method comprising the steps of:

applying the light-cured adhesive as claimed in claim 4 to a sheet substrate to form an adhesive layer having a thickness of 10 μm to 2000 μm; and applying light to the adhesive layer to cure it.

* * * * *